(12) United States Patent
Shimanaka et al.

(10) Patent No.: US 12,146,045 B2
(45) Date of Patent: Nov. 19, 2024

(54) CARBON MATERIAL DISPERSION

(71) Applicant: DAINICHISEIKA COLOR & CHEMICALS MFG. CO., LTD., Tokyo (JP)

(72) Inventors: Hiroyuki Shimanaka, Tokyo (JP); Jun Kamabayashi, Tokyo (JP); Yoshikazu Murakami, Tokyo (JP); Seiji Doi, Tokyo (JP); Yuzuru Sato, Tokyo (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 0 days.

(21) Appl. No.: 18/551,135

(22) PCT Filed: Oct. 22, 2021

(86) PCT No.: PCT/JP2021/039164
§ 371 (c)(1),
(2) Date: Sep. 18, 2023

(87) PCT Pub. No.: WO2022/215291
PCT Pub. Date: Oct. 13, 2022

(65) Prior Publication Data
US 2024/0191054 A1 Jun. 13, 2024

(30) Foreign Application Priority Data
Apr. 6, 2021 (JP) ................. 2021-064841

(51) Int. Cl.
| | |
|---|---|
| *C08K 3/04* | (2006.01) |
| *C08F 220/28* | (2006.01) |
| *C08F 220/58* | (2006.01) |
| *C08F 226/08* | (2006.01) |
| *C09D 133/14* | (2006.01) |
| *C09D 133/24* | (2006.01) |
| *C09D 139/08* | (2006.01) |
| *C09K 23/00* | (2022.01) |

(52) U.S. Cl.
CPC ............ *C08K 3/04* (2013.01); *C08F 220/286* (2020.02); *C08F 220/288* (2020.02); *C08F 220/58* (2013.01); *C08F 226/08* (2013.01); *C09D 133/14* (2013.01); *C09D 133/24* (2013.01); *C09D 139/08* (2013.01); *C09K 23/018* (2022.01)

(58) Field of Classification Search
None
See application file for complete search history.

(56) References Cited

U.S. PATENT DOCUMENTS

| | | | | |
|---|---|---|---|---|
| 8,591,021 | B2* | 11/2013 | Li | C09D 11/326 |
| | | | | 347/100 |
| 11,746,247 | B2* | 9/2023 | Sakai | C08F 220/1807 |
| | | | | 106/493 |
| 2010/0144958 | A1 | 6/2010 | Findlay et al. | |
| 2010/0261103 | A1* | 10/2010 | Sasaki | C09B 67/0096 |
| | | | | 430/7 |
| 2011/0046295 | A1 | 2/2011 | Lee et al. | |
| 2013/0200310 | A1 | 8/2013 | Rudhardt et al. | |
| 2016/0020466 | A1 | 1/2016 | Ulbrich et al. | |
| 2017/0036914 | A1 | 2/2017 | Sohn et al. | |
| 2018/0002179 | A1 | 1/2018 | Okamoto et al. | |
| 2018/0261402 | A1 | 9/2018 | Manabe et al. | |

(Continued)

FOREIGN PATENT DOCUMENTS

| | | |
|---|---|---|
| CN | 115916695 | 4/2023 |
| EP | 2594613 | 5/2013 |

(Continued)

OTHER PUBLICATIONS

JP-60123564-A, Jul. 1985, machine translation (Year: 1985).*
International Search Report, issued in the corresponding PCT application No. PCT/JP2021/039164, dated Dec. 21, 2021, 8 pages (including translation).
International Search Report, issued in PCT application No. PCT/JP2022/029985, dated Sep. 13, 2022, 7 pages (including translation).
International Search Report, issued in PCT application No. PCT/JP2022/029986, dated Oct. 4, 2022, 6 pages (including translation).
U.S. Appl. No. 18/697,562, filed Apr. 1, 2024, 86 pages.

(Continued)

*Primary Examiner* — Satya B Sastri
(74) *Attorney, Agent, or Firm* — HSML P.C.

(57) ABSTRACT

There is provided a carbon material dispersion which has excellent dispersibility and in which the dispersibility is retained stably over a long period of time even when the carbon material dispersion contains a carbon material at a high concentration. The carbon material dispersion is a carbon material dispersion containing a carbon material, water, and a polymeric dispersant, wherein the polymeric dispersant is a polymer including 5 to 40% by mass of a constituent unit (1) derived from a monomer 1, such as 2-vinylpyridine, 50 to 80% by mass of a constituent unit (2) derived from a monomer 2 represented by formula (1) (wherein $R_1$ represents a hydrogen atom or the like, A represents O or NH, X represents an ethylene group or a propylene group, Y represents O, NHCOO, or NHCONH, each of $R_2$ represents a hydrogen atom or the like, n represents 20 to 100, and $R_3$ represents a hydrogen atom or the like), and 0.5 to 40% by mass of a constituent unit (3) derived from a monomer 3 copolymerizable with above-described monomers.

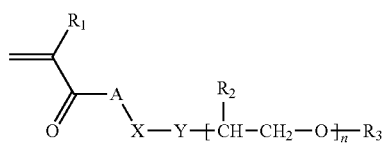

(1)

7 Claims, No Drawings

(56) References Cited

U.S. PATENT DOCUMENTS

| | | | |
|---|---|---|---|
| 2022/0149286 A1 | 5/2022 | Hirai et al. | |
| 2023/0212343 A1 | 7/2023 | Shimanaka et al. | |
| 2023/0357479 A1 | 11/2023 | Shimanaka et al. | |

FOREIGN PATENT DOCUMENTS

| | | |
|---|---|---|
| JP | 60-123564 | 7/1985 |
| JP | 60123564 A * | 7/1985 |
| JP | 2007-076998 | 3/2007 |
| JP | 2009-287002 | 12/2009 |
| JP | 2010-512442 | 4/2010 |
| JP | 2010-174084 | 8/2010 |
| JP | 2010-254546 | 11/2010 |
| JP | 2012-218993 | 11/2012 |
| JP | 2013-205593 | 10/2013 |
| JP | 2013-537570 | 10/2013 |
| JP | 2014-500212 | 1/2014 |
| JP | 2015-003859 | 1/2015 |
| JP | 2016-028109 | 2/2016 |
| JP | 2016-514080 | 5/2016 |
| JP | 2016-204203 | 12/2016 |
| JP | 6152924 | 6/2017 |
| JP | 2019-019155 | 2/2019 |
| JP | 2020-019924 | 2/2020 |
| JP | 6652049 | 2/2020 |
| JP | 6696632 | 5/2020 |
| JP | 2020-194625 | 12/2020 |
| JP | 6834050 | 2/2021 |
| JP | 6860740 | 4/2021 |
| JP | 2021-176140 | 11/2021 |
| WO | 2015/182058 | 12/2015 |
| WO | 2016/136428 | 9/2016 |
| WO | 2020/184012 | 9/2020 |
| WO | 2022/009805 | 1/2022 |

OTHER PUBLICATIONS

U.S. Appl. No. 18/697,564, filed Apr. 1, 2024, 77 pages.
Chinese Office Action, issued in the related Chinese patent application No. 202280066879.2, dated Jul. 13, 2024, 15 pages with the machine translation.
Chinese Office Action, issued in the related Chinese patent application No. 202280066971.9, dated Jul. 18, 2024, 13 pages with the machine translation.

* cited by examiner

CARBON MATERIAL DISPERSION

TECHNICAL FIELD

The present invention relates to a carbon material dispersion.

BACKGROUND ART

Carbon materials (nanocarbon materials), such as carbon black, carbon fibers, carbon nanotubes, graphite, and graphene, are materials having a six-membered graphite structure formed by covalent bonds of carbon atoms and exhibiting various properties, such as electrical conductivity and thermal conductivity, and therefore methods for making use of their properties have been studied in a wide variety of fields. For example, studies on using carbon materials for antistatic agents, electrically conductive materials, plastic-reinforcing materials, semiconductors, fuel cell electrodes, displays, and the like taking notice of their electrical characteristics, thermal characteristics, and characteristics as fillers.

Carbon material dispersions in which the dispersibility of carbon materials is satisfactory and the dispersibility is retained over a long period of time are required in these applications. However, nano-sized carbon materials have high surface energy, and strong Van der Waals force acts thereon, so that nano-sized carbon materials are liable to aggregate. For this reason, even when carbon materials are dispersed in a liquid medium, the carbon materials aggregate immediately in many cases.

A dispersant is generally used in order to disperse a carbon material stably in a liquid medium. For example, a solvent-based dispersion of a carbon nanotube using a cationic surfactant, such as an alkanol amine salt, or a polymeric dispersant, such as a styrene-acrylic resin, has been disclosed (Patent Literatures 1 and 2).

CITATION LIST

Patent Literature

Patent Literature 1: Japanese Patent Laid-Open No. 2010-174084
Patent Literature 2: Japanese Translation of PCT International Application Publication No. 2013-537570

SUMMARY OF INVENTION

Technical Problem

However, when a surfactant is used as a dispersant, it is possible to disperse a carbon nanotube in a liquid medium, but the dispersibility is not necessarily sufficient, and further, there has also been a problem that the carbon nanotube is liable to cause re-aggregation. In addition, when a general polymeric dispersant is used, it is often the case that a resultant dispersion may be likely to exhibit thixotropic characteristics, a carbon material may settle down over time, or the dispersion may cause gelation.

The present invention has been completed in view of such problems of conventional techniques, and an object of the present invention is to provide a carbon material dispersion which has excellent dispersibility and in which the dispersibility is retained stably over a long period of time even when the carbon material dispersion contains a carbon material at a high concentration.

Solution to Problem

That is, the present invention provides a carbon material dispersion described below.

[1] An aqueous carbon material dispersion comprising: a carbon material; water; and a polymeric dispersant, wherein the polymeric dispersant is a polymer comprising: 5 to 40% by mass of a constituent unit (1) derived from a monomer 1 being a quaternary ammonium salt of at least one basic monomer selected from the group consisting of 2-vinylpyridine, 4-vinylpyridine, and 1-vinylimidazole; 50 to 80% by mass of a constituent unit (2) derived from a monomer 2 represented by the following formula (1); and 0.5 to 40% by mass of a constituent unit (3) derived from a monomer 3 copolymerizable with the monomer 1 and the monomer 2, the polymer having a number average molecular weight of 5,000 to 20,000.

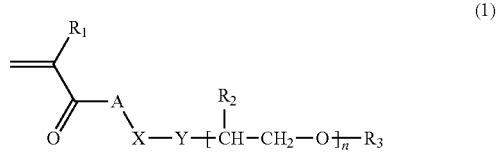

wherein $R_1$ represents a hydrogen atom or a methyl group, A represents O or NH, X represents an ethylene group or a propylene group, Y represents O, NHCOO, or NHCONH, each of $R_2$ mutually independently represents a hydrogen atom or a methyl group, n represents an average number of repeating units of 20 to 100, and $R_3$ represents a hydrogen atom or a methyl group; however, the number $n_H$ of repeating units in which $R_2$ is a hydrogen atom is ½ or more of the total number $n_T$ of repeating units.

[2] The carbon material dispersion according to [1], wherein the carbon material is at least one selected from the group consisting of carbon black, carbon fibers, carbon nanotubes, graphite, and graphene.

[3] The carbon material dispersion according to [1] or [2], wherein the monomer 3 comprises α-methylstyrene, and the content of a constituent unit derived from the α-methylstyrene in the polymer is 0.5 to 5% by mass.

[4] The carbon material dispersion according to any one of [1] to [3], wherein the monomer 3 comprises (meth)acrylic acid, and the content of a constituent unit derived from the (meth)acrylic acid in the polymer is 0.5 to 30% by mass.

[5] The carbon material dispersion according to any one of [1] to [4], wherein the content of the polymeric dispersant based on 100 parts by mass of the carbon material is 10 to 200 parts by mass, and the content of the carbon material is 15% by mass or less.

[6] The carbon material dispersion according to any one of [1] to [5], wherein the content of a water-soluble organic solvent is 20% by mass or less.

[7] The carbon material dispersion according to any one of [1] to [6], wherein the quaternary ammonium salt of the basic monomer is a benzyl chloride salt, naphthylmethyl chloride salt, or anthracenylmethyl chloride salt of the basic monomer.

Advantageous Effects of Invention

The present invention can provide a carbon material dispersion which has excellent dispersibility and in which the dispersibility is retained stably over a long period of time even when the carbon material dispersion contains a carbon material at a high concentration. The carbon material dispersion of the present invention has excellent dispersibility, storage stability, viscosity properties, and processability and is capable of forming a coating film of carbon by coating or the like. In addition, the carbon material dispersion of the present invention is also capable of forming a highly transparent film by appropriately selecting the carbon material. Further, the carbon material is dispersed in a satisfactory state even when the content of a polymeric dispersant is small, and therefore the carbon material dispersion of the present invention is capable of forming a coating film in which the content of the carbon material is large, making it possible to make use of the properties of the carbon material itself, such as electrical conductivity and thermal conductivity.

DESCRIPTION OF EMBODIMENTS

<Carbon Material Dispersion>

Hereinafter, embodiments of the present invention will be described, but the present invention is not limited to the following embodiments. An embodiment of the carbon material dispersion of the present invention contains a carbon material, water, and a polymeric dispersant. Then, the polymeric dispersant is a polymer including: 5 to 40% by mass of a constituent unit (1) derived from at least one monomer 1 selected from the group consisting of 2-vinylpyridine, 4-vinylpyridine, 1-vinylimidazole, and quaternary ammonium salts thereof; 50 to 80% by mass of a constituent unit (2) derived from a monomer 2 represented by the following formula (1); and 0.5 to 40% by mass of a constituent unit (3) derived from a monomer 3 copolymerizable with the monomer 1 and the monomer 2, the polymer having a number average molecular weight of 5,000 to 20,000. Hereinafter, details on the carbon material dispersion of the present embodiment will be described.

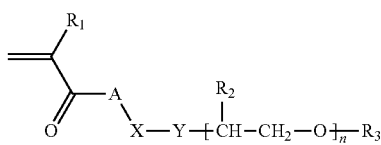

(1)

wherein $R_1$ represents a hydrogen atom or a methyl group, A represents O or NH, X represents an ethylene group or a propylene group, Y represents O, NHCOO, or NHCONH, each of $R_2$ mutually independently represents a hydrogen atom or a methyl group, n represents an average number of repeating units of 20 to 100, and $R_3$ represents a hydrogen atom or a methyl group; however, the number $n_H$ of repeating units in which $R_2$ is a hydrogen atom is ½ or more of the total number $n_T$ of repeating units.

Carbon Material

As the carbon material, at least one selected from the group consisting of carbon black, carbon fibers, carbon nanotubes, graphite, and graphene is preferably used. Examples of the carbon black include acetylene black, furnace black, acetylene black, thermal black, and Ketjen black. With regard to the carbon black, the values of the physical properties, such as the structure, the oil absorption, and the specific surface area, and whether or not a surface modification or the like, such as oxidation, is performed are not particularly limited, and conventionally known carbon black can be used.

Examples of the carbon fibers include PAN-based carbon fibers obtained using polyacrylonitrile as a raw material, pitch-based carbon fibers obtained using pitch as a raw material, and recycled products thereof. Among these, a so-called carbon fiber having a nano-sized fiber diameter and having a cylindrical shape obtained by winding six-membered graphite structures, or a carbon nanotube having a single nano-sized diameter can be used. As the carbon nanofiber and the carbon nanotube, multi-wall or single wall ones, and the like can be used, wherein multi-wall and single wall refer to multi-layered and single layered, respectively.

The particle size, fiber diameter, fiber length, shape, production method, and the like of the carbon material are not particularly limited. The carbon material may be doped with a metal, such as platinum or palladium, or a salt of a metal, such as platinum or palladium. The carbon material may be surface-modified by an oxidation treatment, a plasma treatment, a radiation treatment, a corona treatment, a coupling treatment, or the like.

Liquid Dispersion Medium

The carbon material dispersion of the present embodiment contains water as a liquid dispersion medium that disperses the carbon material. In other words, the carbon material dispersion of the present embodiment is an aqueous dispersion. If necessary, the liquid medium may contain a liquid medium other than water. As the liquid medium other than water, a water-soluble organic solvent can be used. Examples of the organic solvent include alcohols, such as methanol, ethanol, and isopropyl alcohol; polyhydric alcohols, such as ethylene glycol, propylene glycol, and glycerin; ethers, such as tetrahydrofuran; glycol ethers, such as diethylene glycol, triethylene glycol, diethylene glycol monomethyl ether, diethylene glycol monobutyl ether, ethylene glycol dimethyl ether, propylene glycol monomethyl ether, propylene glycol monoethyl ether, propylene glycol monopropyl ether, dipropylene glycol monomethyl ether, and tripropylene glycol monomethyl ether; glycol ether esters, such as diethylene glycol monomethyl ether acetate; amides, such as pyrrolidone, N-methylpyrrolidone, dimethyl formamide, dimethyl acetamide, 3-methoxy-N,N-dimethylpropanamide, and 3-butoxy-N,N-dimethylpropanamide; urea-based solvents, such as tetramethylurea, and 1,3-dimethyl imidazolidinone; sulfur-containing solvents, such as dimethyl sulfoxide and sulfolane; and ionic liquids, such as 1-ethyl-3-methylimidazolium chloride. The content of the water-soluble organic solvent in the carbon material dispersion is preferably set to 20% by mass or less, more preferably 10% by mass or less.

Polymeric Dispersant

The polymeric dispersant is a polymer including a constituent unit (1) derived from a monomer 1, a constituent unit (2) derived form a monomer 2, and a constituent unit derived from a monomer 3. The monomer 1 is at least one selected from the group consisting of 2-vinylpyridine, 4-vinylpyridine, 1-vinylimidazole, and quaternary ammonium salts thereof. Each of 2-vinylpyridine, 4-vinylpyridine, and 1-vinylimidazole is a basic monomer, and the constituent unit (1) derived from any of these monomers is adsorbed onto the carbon material to contribute to dispersibility.

General basic monomers also include dimethylaminoethyl (meth)acrylate and the like. However, by using at least any one of 2-vinylpyridine, 4-vinylpyridine, and 1-vinylimidazole, the dispersion stability of the carbon material dispersion can be improved more, and the viscosity of the carbon material dispersion can be lowered. Each of 2-vinylpyridine, 4-vinylpyridine, and 1-vinylimidazole is a monomer having an aromatic ring having a structure similar to the six-membered ring structure of the carbon material. Therefore, it is conceivable that by adopting the constituent unit (1) derived from any of these monomers, the adsorption power to the carbon material due to van der Waals force or n-n stacking can be enhanced. Further, the surface of the carbon material may be oxidized and a carboxy group or a phenolic hydroxyl group may exist thereon. It is conceivable that when the carboxy group or the phenolic hydroxyl group forms an ionic bond with the basic group in the constituent unit (1), the polymeric dispersant is more likely to be adsorbed onto the carbon material to further improve the dispersibility. Note that the monomer 1 is particularly preferably 4-vinylpyridine.

By using any of quaternary ammonium salts of 2-vinylpyridine, 4-vinylpyridine, and 1-vinylimidazole as the monomer 1, the dispersibility can further be enhanced.

By making the constituent unit derived from any of 2-vinylpyridine, 4-vinylpyridine, and 1-vinylimidazole into a quaternary ammonium salt, the constituent unit (1) derived from a quaternary ammonium salt can be prepared. For example, a halide, a sulfuric acid ester, and the like can be used as a material for forming a quaternary ammonium salt (a quaternary ammonium salt-forming agent). Examples of the halide include methyl chloride and benzyl chloride. Examples of the sulfuric acid ester include dimethyl sulfate and diethyl sulfate. As the quaternary ammonium salt, an aryl methyl halide is preferably. Examples of the aryl methyl group include a benzyl group, a naphthylmethyl group, an anthracenylmethyl group, and a pyrenylmethyl group. Among these, the aryl methyl group is preferably a naphthylmethyl group.

The monomer 2 is a macromonomer represented by the following formula (1), the macromonomer having a polyalkylene glycol chain. By introducing the constituent unit (2) derived from the monomer 2, a polymer having a structure in which the polyalkylene glycol chain is grafted can be prepared. The polyalkylene glycol chain dissolves in water which is a liquid dispersion media. Then, the polyalkylene glycol chains dissolving in the liquid dispersion media cause steric hindrance between particles and repulse each other, so that the constituent unit (1) absorbed onto the carbon material can disperse the carbon material in the liquid dispersion medium stably in a satisfactory state over a long period of time.

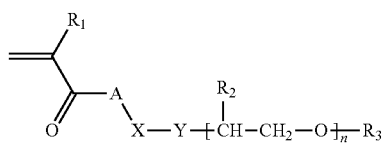

(1)

wherein $R_1$ represents a hydrogen atom or a methyl group, A represents O or NH, X represents an ethylene group or a propylene group, Y represents O, NHCOO, or NHCONH, each of $R_2$ mutually independently represents a hydrogen atom or a methyl group, n represents an average number of repeating units of 20 to 100, and $R_3$ represents a hydrogen atom or a methyl group; however, the number $n_H$ of repeating units in which $R_2$ is a hydrogen atom is ½ or more of the total number $n_T$ of repeating units.

The molecular weight of the monomer 2 represented by formula (1) is about 880 to about 5,800. In formula (1), the number $n_H$ of repeating units in which $R_2$ is a hydrogen atom being ½ or more of the total number $n_T$ of repeating units can make the polyalkylene glycol chain soluble to water. Above all, the number $n_H$ of repeating units in which $R_2$ is a hydrogen atom is preferably 3/5 or more of the total number $n_T$ of repeating units.

The monomer 3 is a monomer copolymerizable with the monomer 1 and the monomer 2. As the monomer 3, a (meth)acrylic acid-based monomer is preferably used. Specific examples of the monomer 3 include (meth)acrylic acid; monofunctional (meth)acrylates having a substituent, such as methyl, ethyl, propyl, butyl, amyl, 2-ethylhexyl, isooctyl, nonyl, dodecyl, hexadecyl, octadecyl, isostearyl, behenyl, cyclohexyl, trimethylcyclohexyl, t-butylcyclohexyl, benzyl, methoxyethyl, butoxyethyl, phenoxyethyl, nonylphenoxyethyl, glycidyl, isobornyl, dicyclopentanyl, dicyclopentenyl, dicyclopentenyloxyethyl, isobornyl, 2-hydroxyethyl, 2-hydroxypropyl, and 4-hydroxybutyl; and polymer-type (meth) acrylates which are macromonomers, such as a poly(n≥2) alkylene(C2-4) glycol mono(meth)acrylate, a poly(n≥2) alkylene(C2-4) glycol monoalkyl(C1-22) mono(meth) acrylate, and a poly(n≥2)hydroxyalkanoic acid(C5-18) mono(meth)acrylate. Further, vinyl monomers, such as styrene, vinyltoluene, vinylnaphthalene, vinylcaprolactone, α-methylstyrene, and vinyl acetate, can also be used as the monomer 3.

α-Methylstyrene is preferably used as the monomer 3 because the molecular weight can easily be controlled. Specifically, it is preferable that the monomer 3 contains α-methylstyrene and the content of the constituent unit derived from α-methylstyrene in the polymer is 0.5 to 5% by mass, more preferably 1 to 3% by mass. When the content of the constituent unit derived from α-methylstyrene is less than 0.5% by mass, the polymerization may progress somewhat nonuniformly, and the monomer 2 may be left or gelation may occur. On the other hand, when the content of the constituent unit derived from α-methylstyrene is more than 5% by mass, (α-methylstyrene, which has somewhat poor polymerizability, may be left, or the molecular weight may be excessively controlled, which may somewhat lower the polymerization rate.

In addition, (meth)acrylic acid is preferably used as the monomer 3. When the polymer contains a constituent unit derived from (meth)acrylic acid, which is an acid component, the water solubility of the polymer is improved, and in the case where a quaternary ammonium salt group is also present in the polymer, the polymer exhibits zwitterionic properties and therefore is more likely to be ionically adsorbed on the carbon material, so that the dispersibility can further be improved. Further, when the polymer exhibits zwitterionic properties, a cross-link structure is easily formed by intramolecular and intermolecular ion bond formation, so that detachment from the carbon material can further be suppressed.

In the polymer, the content of the constituent unit derived form (meth)acrylic acid is preferably 0.5 to 30% by mass, more preferably 1 to 10% by mass. When the content of the constituent unit derived from (meth)acrylic acid is less than 0.5% by mass, the effect of the constituent unit as the acid component tends to be deficient. On the other hand, when the content of the constituent unit derived from (meth) acrylic acid is more than 30% by mass, the water-solubility is too high, so that the water fastness of a coating film or the like to be formed may be somewhat lowered.

In the polymeric dispersant (polymer), the content of the constituent unit (1) is 5 to 40% by mass, preferably 10 to 20% by mass, the content of the constituent unit (2) is 50 to 80% by mass, preferably 55 to 75% by mass, and the content of the constituent unit (3) is 0.5 to 40% by mass, preferably 1 to 31% by mass. Note that the total amount of the constituent unit (1), the constituent unit (2), and the constituent unit (3) is assumed to be 100% by mass.

When the content of the constituent unit (1) is less than 5% by mass, the polymeric dispersant (polymer) cannot sufficiently be adsorbed onto the carbon material. On the other hand, when the content of the constituent unit (1) is more than 40% by mass, coloration or odor may occur, and the polymeric dispersants (polymers) are likely to get together to be adsorbed onto the carbon material, so that the polymeric dispersant may function as a flocculant.

Among the constituent units included in the polymer, the proportion of the constituent unit (2) is the largest. Therefore, the polyalkylene glycol chains densely present in the polymer cause steric hindrance to suppress the dispersed carbon materials to come close to each other, so that the carbon material can stably be dispersed. When the content of the constituent unit (2) is less than 50% by mass, the steric hindrance is insufficient and the polymer may be hard to dissolve in water. On the other hand, when the content of the constituent unit (2) is more than 80% by mass, the monomer 2, which has somewhat low reactivity, is likely to be left without being polymerized. Note that when the content of the constituent unit (3) is more than 40% by mass, the proportion of the other constituent units relatively decreases, and therefore the function of the polymer as a dispersant is lowered.

The number average molecular weight of the polymer which is used as the polymeric dispersant is 5,000 to 20,000, preferably 10,000 to 15,000. When the number average molecular weight of the polymer is lower than 5,000, the introduction amount of the constituent unit (2) derived from the monomer 2 which is a macromonomer is small, so that the dispersion stability is insufficient. On the other hand, when the number average molecular weight of the polymer is higher than 20,000, the viscosity of the resultant carbon material dispersion is excessively high, and the amount of the polymeric dispersant needed may be too large. The number average molecular weight herein is a value in terms of polystyrene as measured by gel permeation chromatography.

(Method for Producing Polymeric Dispersant (Polymer))

The polymer which is used as the polymeric dispersant can be produced by a conventionally known radical polymerization method or living radical polymerization method. Among others, the polymer is preferably produced by a living radical polymerization method because it is possible to make the molecular weight of the main chain uniform, and by changing the methods of adding monomers, AB block copolymers can be prepared.

Examples of the living radical polymerization include a polymerization method in which the molecular weight is adjusted using a chain transfer agent such as a thiol, an atom transfer radical polymerization method (ATRP method), a reversible addition-fragmentation chain transfer polymerization method (RAFT method), a nitroxide-mediated polymerization method (NMP method), an organotellurium-mediated living radical polymerization method (TERP method), an iodine transfer polymerization method (ITP method), a reversible chain transfer catalyzed polymerization method (RTCP method), and a reversible complexation mediated polymerization method (RCMP method).

The polymerization conditions and the like are not particularly limited. An azo-based radical generator, a peroxide-based radical generator, a photosensitizer, and the like may be added to the reaction system. The polymerization type may be solvent-free polymerization, solution polymerization, emulsion polymerization, or the like. Among these, the polymerization type is preferably solution polymerization, and the solution polymerization is more preferably performed in the above-described water-soluble organic solvent that can be blended in the carbon material dispersion. By performing the solution polymerization in a water-soluble organic solvent, the resultant polymer solution can be blended as it is in the carbon material dispersion.

By polymerizing the monomer 1, monomer 2, and the monomer 3 by solution polymerization or the like, a desired polymer can be obtained. After the monomer 1, the monomer 2, and the monomer 3 are polymerized, an alkyl halide, such as benzyl chloride, naphthylmethyl chloride, anthracenylmethyl chloride, pyrenylmethyl chloride, or naphthylmethyl bromide, may be added to the reaction system to make the amino group derived from the monomer 1 into a quaternary ammonium salt. Further, bis(trifluoromethylsulfonyl)imide lithium salt, bis(heptafluorobutylsulfonyl)imide lithium salt, or the like may be added to form a sulfonimide salt from the quaternary ammonium salt by ion exchange.

(Carbon Material Dispersion)

The content of the polymeric dispersant based on 100 parts by mass of the carbon material is preferably 10 to 200 parts by mass, more preferably 20 to 150 parts by mass, particularly preferably 30 to 100 parts by mass. Further, the content of the carbon material in the carbon material dispersion is preferably 15% by mass or less. By setting the content of the polymeric dispersant based on the amount of the carbon material within the above-described range, a carbon material dispersion in which the carbon material is more stably dispersed can be prepared. When the amount of the polymeric dispersant based on the amount of the carbon material is excessively small, the dispersibility may be somewhat insufficient. On the other hand, when the amount of the polymeric dispersant based on the amount of the carbon material is excessively large, the viscosity of the carbon material dispersion is likely to increase, and the ratio of the carbon material in the solid content may be relatively lowered.

The carbon material dispersion can further contain an additive, a resin, and the like. Examples of the additives include a water-soluble dye, a pigment, an ultraviolet absorber, a light stabilizer, an antioxidizing agent, a leveling agent, a defoamer, an antiseptic, an antifungal agent, a photopolymerization initiator, and other pigment dispersants. Examples of the resin include a polyolefin resin, a poly(halogenated olefin) resin, a polyester resin, a polyamide resin, a polyimide resin, a polyether resin, a polyvinyl resin, a polystyrene resin, a polyvinyl alcohol resin, a polymethacrylate resin, a polyurethane resin, a polyepoxy resin, a polyphenol resin, a polyurea resin, a polyether sulfone resin.

(Method for Producing Carbon Material Dispersion)

The carbon material dispersion of the present embodiment can be prepared using the above-described polymer as the polymeric dispersant, according to a conventionally known method, by dispersing the carbon material in a liquid dispersion medium containing water as a main component. For example, dispersion methods such as stirring with a disper, three-roll kneading, ultrasonic dispersion, dispersion with a bead mill, and dispersion using an emulsifier, a high-pressure homogenizer, or the like can be used. Among these, dispersion with a bead mill, ultrasonic dispersion, dispersion using a high-pressure homogenizer are preferable because the dispersion effect is high.

(Method of Checking Dispersion State of Carbon Material)

The dispersibility of the carbon material in the carbon material dispersion can be checked by the following method in which absorbance is measured using a spectrophotometer. Firstly, a plurality of dispersions in which the concentrations of the carbon material are known and extremely low is prepared, and the absorbance of each dispersion at a particular wavelength is measured to plot the absorbance versus the concentration of the carbon material and make a calibration curve. Then, the carbon material dispersion is subjected to a centrifugal separation treatment to settle and separate the carbon material left without being dispersed, and thus a supernatant solution is obtained. The obtained supernatant solution is diluted to adjust the concentration so that the absorbance can be measured, and then the absorbance is measured to calculate the concentration of the carbon material using the calibration line. By comparing the calculated concentration of the carbon material with the amount of the carbon material charged, the dispersibility of the carbon material can be evaluated.

Further, by checking whether aggregates are present or not after the carbon material dispersion after the centrifugal separation treatment is left to stand for a long time, the dispersibility of the carbon material can also be checked. Furthermore, by observing a state of the carbon material dispersion dropped onto a glass plate or the like using an electron microscope, or by measuring a physical property value, such as electric conductivity, of a film formed by applying and drying the carbon material dispersion, the dispersibility of the carbon material can also be checked.

<Use of Carbon Material Dispersion>

The carbon material dispersion of the present embodiment is an aqueous dispersion and therefore is an environmentally friendly material and is useful as a material for aqueous paints and inks, plastic-shaped products, and the like. In addition, utilization of the carbon material dispersion of the present embodiment as an electrically conductive material or a thermally conductive agent can be expected, and besides, applications to antistatic materials can also be expected. An aqueous paint or ink can be prepared by, for example, adding components such as, for example, a solvent, a resin, an additive, and the like to the carbon material dispersion. Further, the carbon material dispersion may also be added to commercially available paints and inks. A shaped product of a plastic in which the carbon material is dispersed can be produced by, for example, adding the carbon material dispersion to a molten plastic material and then removing water. Furthermore, a shaped product of a plastic in which the carbon material is dispersed can also be produced by adding the carbon material dispersion to a plastic material in the form of fine powder and then removing water or depositing the carbon material.

EXAMPLES

Hereinafter, the present invention will specifically be described based on Examples, but the present invention is not limited to those Examples. Note that "parts" and "%" in Examples and Comparative Examples are on a mass basis unless otherwise noticed.

Synthesis of Polymeric Dispersant (Polymer)

Synthesis Example 1

(a) Synthesis of Macromonomer

In a reaction apparatus equipped with a stirrer, a reflux condenser, a thermometer, and a dropping funnel, 142.5 parts (0.067 mol) of one-terminal aminated polypropylene glycol polyethylene glycol monomethyl ether copolymer (M41) (trade name "Genamin M41/2000," manufactured by Clariant AG, measured amine value 26.4 mgKOH/g) was placed and stirred. In the dropping funnel, 10.4 parts (0.067 mol) of 2-isocyanatoethyl methacrylate (MOI) (trade name "Karenz MOI," manufactured by Resonac Holdings Corporation) was placed, and dropped over 30 minutes into the reaction apparatus cooled in a water bath. Part of the reaction solution was sampled for IR measurement, which confirmed disappearance of the absorption of the isocyanate group derived from MOI and generation of a urea bond. In addition, the amine value of the product was 0.2 mgKOH/g, which confirmed that the reaction between the amino group and the isocyanate group almost came to an end. Note that the amine value was measured with an automatic potentiometric titrator using a 0.1 mol/L 2-propanolic hydrochloric acid solution. Those described above confirmed that a polypropylene glycol polyethylene glycol copolymer (MC-1) in which a methacryloyl group is bonded at one terminal was produced. The number average molecular weight (Mn) in terms of polystyrene and polydispersity index (PDI=weight average molecular weight (Mw)/number average molecular weight (Mn)) of MC-1, measured by gel permeation chromatography (GPC) using tetrahydrofuran (THF) as a developing solvent, were 2,800 and 1.09, respectively. MC-1 is a macromonomer corresponding to the monomer 2 represented by formula (1), and in MC-1, the number $n_H$ of repeating units is ½ or more of the total number $n_T$ of repeating units.

(b) Synthesis of Polymeric Dispersant

In a reaction apparatus equipped with a stirrer, a reflux condenser, a thermometer, and a nitrogen introducing tube, 95 parts of diethylene glycol monobutyl ether (BDG), 70 parts of MC-1, 2.5 parts of α-methylstyrene ((αMS), 10.5 parts of styrene (St), and 17 parts of 4-vinylpyridine (4VP) were placed and heated to 75° C. under nitrogen gas bubbling. When the temperature reached 70° C., 5 parts of dimethyl 2,2'-azobis(isobutyrate) (V-601) (trade name "V-601," manufactured by FUJIFILM Wako Pure Chemical Corporation) was added to perform polymerization at 75° C. for 4 hours. Further, 2.5 parts of V-601 was added to perform polymerization at 75° C. for 4 hours, and thus a liquid containing a polymer (polymeric dispersant A-1) was obtained. The Mn, PDI, and peak top molecular weight (PT) of polymeric dispersant A-1 (polymer) were 9,600, 1.83, and 22,700, respectively, and a peak derived from MC-1 used as a raw material was hardly observed. In addition, the amine value (in terms of pure resin content) of polymeric dispersant A-1 was 86.2 mgKOH/g. The solid content of the liquid containing polymeric dispersant A-1, as measured using a moisture meter, was 50.4%.

Synthesis Examples 2 to 5

Liquids containing polymeric dispersants A-2 to 5 respectively were obtained in the same manner as in Synthesis Example 1, described above, except that compositions shown in Table 1 were adopted. The physical properties of polymeric dispersants A-2 to 5 obtained are shown in Table 1. Note that each of MC-2 and MC-3 obtained in Synthesis Examples 2 and 3 respectively is a macromonomer corresponding to the monomer 2 represented by formula (1), and in MC-2 and MC-3, the number $n_H$ of repeating units is ½ or more of the total number $n_T$ of repeating units.

The meanings of abbreviations in Table 1 are described below.

M1000: polypropylene glycol polyethylene glycol methyl ether having an amino group at one terminal (trade name "JEFFAMINE M1000," manufactured by Huntsman Corporation)

M3085: polypropylene glycol polyethylene glycol methyl ether having an amino group at one terminal (trade name "JEFFAMINE M3085," manufactured by Huntsman Corporation)

2-VP: 2-vinylpyridine
1VI: 1-vinylimidazole meric dispersant A-6 was 40.2%. In addition, the amine value of polymeric dispersant A-6 was almost 0 mgKOH/g,

TABLE 1

Compositions and physical properties of polymers obtained in Synthesis Examples 1 to 5

|  |  | Synthesis Example 1 | Synthesis Example 2 | Synthesis Example 3 | Synthesis Example 4 | Synthesis Example 5 |
|---|---|---|---|---|---|---|
|  | Polymeric dispersant | A-1 | A-2 | A-3 | A-4 | A-5 |
| Macromonomer | Name | MC-1 | MC-2 | MC-3 | MC-1 | MC-1 |
|  | PPG/PEG copolymer | M41 | M1000 | M3085 | M41 | M41 |
|  | Mn | 2,800 | 1,700 | 4,100 | 2,800 | 2,800 |
|  | PDI | 1.09 | 1.08 | 1.11 | 1.09 | 1.09 |
| Whole | Monomer 1 | 4VP | 4 VP | 4VP | 2VP | 1VI |
|  | Monomer 3 | αMS/St | αMS/St | αMS/St | αMS/St | αMS/St |
|  | Composition | MC-1/αMS/St/4VP | MC-2/αMS/St/4VP | MC-3/αMS/St/4VP | MC-1/αMS/St/2VP | MC-1/αMS/St/1VI |
|  | Compositional ratio (mass ratio) | 70.0/2.5/10.5/17.0 | 70.0/2.5/10.5/17.0 | 70.0/2.5/10.5/17.0 | 70.0/2.5/10.5/17.0 | 70.0/2.5/10.5/17.0 |
|  | Monomer 1/monomer 2/ monomer 3 (mass ratio) | 17.0/70.0/13.0 | 17.0/70.0/13.0 | 17.0/70.0/13.0 | 17.0/70.0/13.0 | 17.0/70.0/13.0 |
|  | Mn | 9,600 | 8,900 | 10,800 | 9,100 | 9,400 |
|  | PDI | 1.83 | 1.92 | 1.71 | 1.89 | 1.76 |
|  | Amine value (mgKOH/g) | 86.2 | 88.8 | 85.9 | 88.1 | 97.2 |
|  | Solvent | BDG | BDG | BDG | BDG | BDG |
|  | Solid content (%) | 50.4 | 50.8 | 50.1 | 50.9 | 50.7 |

Synthesis Example 6

(c) Making Amino Group into Quaternary Ammonium Salt

In a reaction apparatus equipped with a stirrer, a reflux condenser, a thermometer, and a dropping funnel, 100 parts of polymeric dispersant A-1 was placed. After 30 parts of BDG was added thereto for dilution, the resultant mixture was stirred for homogenization at room temperature for 10 minutes to obtain a solution. In the obtained solution, 0.081 mol of an amino group derived from 4VP is present. A solution containing 10.25 g of BDG and 10.25 g (0.081 mol) of benzyl chloride (BzCl) was dropped from the dropping funnel at room temperature over 30 minutes. After the dropping was completed, the resultant mixture was heated to 80° C., and the temperature was kept for 5 hours to obtain a liquid containing a polymer (polymeric dispersant A-6). The solid content of the obtained liquid containing poly-meric dispersant A-6 was 40.2%. In addition, the amine value of polymeric dispersant A-6 was almost 0 mgKOH/g, which demonstrated that the reaction progressed quantitatively to make all the amino groups derived from 4VP into a quaternary ammonium salt.

Synthesis Examples 7 to 9

Liquids containing polymeric dispersants A-7 to 9 respectively were obtained in the same manner as in Synthesis Example 6, described above, except that compositions shown in Table 2 were adopted. The physical properties of polymeric dispersants A-7 to 9 obtained are shown in Table 2.

The meanings of abbreviations in Table 2 are described below.
VBQ: benzyl chloride salt of 4-vinylpyridine
VNQ: naphthylmethyl chloride salt of 4-vinylpyridine
VAQ: anthracenylmethyl chloride salt of 4-vinylpyridine

TABLE 2

Compositions and physical properties of polymers obtained in Synthesis Examples 6 to 9

|  |  | Synthesis Example 6 | Synthesis Example 7 | Synthesis Example 8 | Synthesis Example 9 |
|---|---|---|---|---|---|
|  | Polymeric dispersant | A-6 | A-7 | A-8 | A-9 |
| Macromonomer | Name | MC-1 | MC-1 | MC-1 | MC-1 |
|  | PPG/PEG copolymer | M41 | M41 | M41 | M41 |
|  | Mn | 2,800 | 2,800 | 2,800 | 2,800 |
|  | PDI | 1.09 | 1.09 | 1.09 | 1.09 |
| Whole | Monomer 1 | VBQ | 4VP/VBQ | VNQ | 4VP/VAQ |
|  | Monomer 3 | αMS/St | αMS/St | αMS/St | αMS/St |
|  | Composition | MC-1/αMS/St/VBQ | MC-2/αMS/St/4VP/VBQ | MC-3/αMS/St/VNQ | MC-1/αMS/St/4VP/VAQ |
|  | Compositional ratio (mass ratio) | 58.1/2.1/8.7/31.1 | 63.5/2.3/9.5/7.7/17.0 | 54.5/1.9/8.2/35.4 | 54.9/2.0/8.2/3.3/31.6 |
|  | Monomer 1/monomer 2/ monomer 3 (mass ratio) | 31.1/58.1/10.8 | 24.7/63.5/11.8 | 35.4/54.5/10.1 | 34.9/54.9/10.2 |
|  | Amine value (mgKOH/g) | ≈0 | 41.1 | ≈0 | 17.6 |
|  | Quaternary ammonium salt formation ratio (%) | 100 | 50 | 100 | 75 |
|  | Solvent | BDG | BDG | BDG | BDG |
|  | Solid content (%) | 40.2 | 40.6 | 41.0 | 40.5 |

Synthesis Example 10

In a reaction apparatus equipped with a stirrer, a reflux condenser, a thermometer, and a nitrogen introducing tube, 95.0 parts of BDG, 70 parts of MC-1, 2.5 parts of (CMS, 10.4 parts of St, 7.7 parts of methacrylic acid (MAA), and 9.4 parts of 4VP were placed and heated to 75° C. under nitrogen gas bubbling. When the temperature reached 70° C., 5 parts of V-601 was added to perform polymerization at 75° C. for 4 hours. Further, 2.5 parts of V-601 was added to perform polymerization at 75° C. for 4 hours, and thus a liquid containing a polymer (polymeric dispersant A-10) was obtained. The Mn, PDI, and PT of polymeric dispersant A-10 (polymer) were 11,900, 1.88, and 25,900, respectively, and a peak derived from MC-1 used as a raw material was hardly observed. In addition, the amine value (in terms of pure resin content) and the acid value (in terms of pure resin content) of polymeric dispersant A-10 were 50.0 mgKOH/g and 50.0 mgKOH/g, respectively. This polymer is a zwitterionic polymeric dispersant having an amino group and a carboxy group in the structure thereof. The solid content of the liquid containing polymeric dispersant A-10 was 50.9%.

Synthesis Examples 11 to 13

Liquids containing polymeric dispersants A-11 to 13 respectively were obtained in the same manner as in Synthesis Example 10, described above, except that compositions shown in Table 3 were adopted. The physical properties of polymeric dispersants A-11 to 13 obtained are shown in Table 3.

Comparative Synthesis Example 1

In a reaction apparatus equipped with a stirrer, a reflux condenser, a thermometer, and a nitrogen introducing tube, 95.0 parts of BDG, 70 parts of MC-1, 2.5 parts of (CMS, 7.5 parts of St, and 20 parts of 2-(N,N-dimethylaminoethyl) methacrylate (DMAEMA) were placed. Thereafter, a liquid containing a polymer (polymeric dispersant H-1) was obtained in the same manner as in Synthesis Example 1 ((b) Synthesis of Polymeric Dispersant), described above. The Mn, PDI, and PT of polymeric dispersant H-1 (polymer) were 10,400, 1.81, and 23,200, respectively, and a peak derived from MC-1 used as a raw material was hardly observed. In addition, the amine value (in terms of pure resin content) of polymeric dispersant H-1 was 73.2 mgKOH/g. The solid content of the liquid containing polymeric dispersant H-1 was 50.5%.

Comparative Synthesis Examples 2 and 3

Liquids containing polymeric dispersants H-2 and 3 respectively were obtained in the same manner as in Comparative Synthesis Example 1, described above, except that compositions shown in Table 4 were adopted. The physical properties of polymeric dispersants H-2 and 3 obtained are shown in Table 4.

TABLE 3

Compositions and physical properties of polymers obtained in Synthesis Examples 10 to 13

| | Polymeric dispersant | Synthesis Example 10 A-10 | Synthesis Example 11 A-11 | Synthesis Example 12 A-12 | Synthesis Example 13 A-13 |
|---|---|---|---|---|---|
| Macromonomer | Name | MC-1 | MC-1 | MC-1 | MC-1 |
| | PPG/PEG copolymer | M41 | M41 | M41 | M41 |
| | Mn | 2,800 | 2,800 | 2,800 | 2,800 |
| | PDI | 1.09 | 1.09 | 1.09 | 1.09 |
| Whole | Monomer 1 | 4VP | 4VP | 2VP | 1VI |
| | Monomer 3 | αMS/St/MAA | αMS/St/MAA | αMS/St/MAA | αMS/St/MAA |
| | Composition | MC-1/αMS/St/4VP/MAA | MC-1/αMS/St/4VP/MAA | MC-1/αMS/St/2VP/MAA | MC-1/αMS/St/1VI/MAA |
| | Compositional ratio (mass ratio) | 70.0/2.5/10.4/9.4/7.7 | 70.0/2.5/9.2/12.1/6.2 | 70.0/2.5/7.1/11.2/9.2 | 70.0/2.5/10.4/9.4/7.7 |
| | Monomer 1/monomer 2/ monomer 3 (mass ratio) | 9.4/70.0/20.6 | 12.1/70.0/17.9 | 11.2/70.0/18.8 | 9.4/70.0/20.6 |
| | Mn | 11,900 | 10,600 | 10,900 | 11,300 |
| | PDI | 1.88 | 1.92 | 1.85 | 1.89 |
| | Amine value (mgKOH/g) | 50 | 64.5 | 59.7 | 56 |
| | Acid value (mgKOH/g) | 50 | 40.4 | 60.1 | 50.1 |
| | Solvent | BDG | BDG | BDG | BDG |
| | Solid content (%) | 50.9 | 50.6 | 50.1 | 50.9 |

TABLE 4

Compositions and physical properties of polymers obtained in Comparative Synthesis Examples 1 to 3

| | Polymeric dispersant | Comparative Synthesis Example 1 H-1 | Comparative Synthesis Example 2 H-2 | Comparative Synthesis Example 3 H-3 |
|---|---|---|---|---|
| Macromonomer | Name | MC-1 | MC-1 | MC-1 |
| | PPG/PEG copolymer | M41 | M41 | M41 |
| | Mn | 2,800 | 2,800 | 2,800 |
| | PDI | 1.09 | 1.09 | 1.09 |
| Whole | Monomer 1 | DMAEMA | 4VP | 4VP |
| | Monomer 3 | αMS/St | αMS/St | αMS/St |
| | Composition | MC-1/αMS/St/DMAEMA | MC-1/αMS/St/4VP | MC-1/αMS/St/4VP |
| | Compositional ratio (mass ratio) | 70.0/2.5/7.5/20.0 | 45.0/2.5/32.5/20.0 | 70.0/0.3/12.7/17.0 |
| | Monomer 1/monomer 2/monomer 3 (mass ratio) | 20.0/70.0/10.0 | 20.0/45.0/35.0 | 17.0/70.0/13.0 |
| | Mn | 10,400 | 8,900 | 23,800 |
| | PDI | 1.81 | 2.12 | 2.46 |
| | Amine value (mgKOH/g) | 73.2 | 99.7 | 87.8 |
| | Solvent | BDG | BDG | BDG |
| | Solid content (%) | 50.5 | 51.3 | 50.7 |

<Preparation of Carbon Nanotube Dispersion>

Reference Example 1

In a resin container, 3 parts of a carbon nanotube (CNT) (average diameter 40 nm, average length 8.0 μm), 91.05 parts of water, 5.59 parts of the liquid (solid content 50.4%) containing polymeric dispersant A-1, and 180 parts of zirconia beads (diameter 0.8 mmϕ) were placed. The CNT was wetted but sank at the bottom of the container, and the upper part of the resultant mixture was a transparent layer. After a dispersion treatment was performed on the mixture for 60 minutes using Scandex, the liquid became uniformly black and the aggregation state of the CNT was released. Subsequently, a centrifugal treatment was performed to settle and separate the CNT which was not dispersed sufficiently, and the resultant liquid was taken out as CNT dispersion-1.

Reference Examples 2 to 5 and 10 to 13, Examples 6 to 9, and Comparative Examples 1 to 3

CNT dispersions-2 to 16 were prepared in the same manner as in Reference Example 1, described above, except that combinations shown in Table 5 were adopted.

TABLE 5

Preparation of CNT dispersion

| | CNT dispersion | Amount (parts) of CNT | Polymeric dispersant Type | Amount* (parts) | Amount (parts) based on 100 parts of CNT | Amount (parts) of water | Total (parts) |
|---|---|---|---|---|---|---|---|
| Reference Example 1 | -1 | 3 | A-1 | 5.95 | 100 | 91.05 | 100 |
| Reference Example 2 | -2 | 3 | A-2 | 5.91 | 100 | 91.09 | 100 |
| Reference Example 3 | -3 | 3 | A-3 | 5.99 | 100 | 91.01 | 100 |
| Reference Example 4 | -4 | 3 | A-4 | 5.89 | 100 | 91.11 | 100 |
| Reference Example 5 | -5 | 3 | A-5 | 5.92 | 100 | 91.08 | 100 |
| Example 6 | -6 | 3 | A-6 | 7.46 | 100 | 89.54 | 100 |
| Example 7 | -7 | 3 | A-7 | 7.39 | 100 | 89.61 | 100 |
| Example 8 | -8 | 3 | A-8 | 7.32 | 100 | 89.68 | 100 |
| Example 9 | -9 | 3 | A-9 | 7.41 | 100 | 89.59 | 100 |
| Reference Example 10 | -10 | 3 | A-10 | 5.89 | 100 | 91.11 | 100 |
| Reference Example 11 | -11 | 3 | A-11 | 5.93 | 100 | 91.07 | 100 |
| Reference Example 12 | -12 | 3 | A-12 | 5.99 | 100 | 91.01 | 100 |
| Reference Example 13 | -13 | 3 | A-13 | 5.89 | 100 | 91.11 | 100 |
| Comparative Example 1 | -14 | 3 | H-1 | 5.94 | 100 | 91.06 | 100 |
| Comparative Example 2 | -15 | 3 | H-2 | 5.85 | 100 | 91.15 | 100 |
| Comparative Example 3 | -16 | 3 | H-3 | 5.92 | 100 | 91.08 | 100 |

*Amount of liquid containing polymeric dispersant

<Evaluations of CNT Dispersions>

The CNT concentration after the centrifugal separation was measured for the prepared CNT dispersions. A spectrophotometer was used for the measurement of the CNT concentration. Specifically, a calibration curve was made by measuring the absorbance for samples in which the CNT concentrations are known. Then, the absorbance of each sample diluted to a concentration at which the absorbance was able to be measured was measured, and the CNT concentration of the sample was calculated from the calibration curve. In addition, the viscosity at 25° C. was measured for the prepared CNT dispersions using an E-type viscometer. Further, the states after the CNT dispersions subjected to the centrifugal separation were left to stand for 7 days were observed to check whether or not aggregates were present. In addition, the ratio (%) of the CNT concentration after the centrifugal separation to the CNT concentration as designed was calculated as "dispersion stability (%)." The dispersion stability being closer to 100% means that the dispersibility of the CNT is more satisfactory. Results of the evaluations of the dispersibility of the CNT are shown in Table 6.

<Preparation of Nanographene Dispersion>

Reference Example 14

In a resin container, 5 parts of a nanographene (NGR) (average diameter 5 μm, average thickness 6 to 8 nm), 85.08 parts of water, and 9.92 parts of the liquid (solid content 50.4%) containing polymeric dispersant A-1 were placed. A stirring bar was placed in the container, and the contents were irradiated with ultrasonic waves using an ultrasonic disperser with an output of 300 W for 60 minutes under stirring using a magnetic stirrer, and thus NGR dispersion-1 which was a viscous liquid was obtained.

TABLE 6

Results of evaluations of dispersibility of CNT

| | CNT dispersion | Polymeric dispersant | CNT concentration (%) as designed | Initial viscosity (mPa·s) | CNT concentration (%) after centrifugal separation | Dispersion stability (%) | State after being left to stand for 7 days |
|---|---|---|---|---|---|---|---|
| Reference Example 1 | −1 | A-1 | 3 | 4.6 | 2.94 | 98.0 | Aggregates not present |
| Reference Example 2 | −2 | A-2 | 3 | 5.2 | 2.91 | 97.0 | Aggregates not present |
| Reference Example 3 | −3 | A-3 | 3 | 4.5 | 2.95 | 98.3 | Aggregates not present |
| Reference Example 4 | −4 | A-4 | 3 | 4.9 | 2.92 | 97.3 | Aggregates not present |
| Reference Example 5 | −5 | A-5 | 3 | 4.9 | 2.93 | 97.7 | Aggregates not present |
| Example 6 | −6 | A-6 | 3 | 3.6 | 2.96 | 98.7 | Aggregates not present |
| Example 7 | −7 | A-7 | 3 | 4.1 | 2.95 | 98.3 | Aggregates not present |
| Example 8 | −8 | A-8 | 3 | 3.3 | 2.97 | 99.0 | Aggregates not present |
| Example 9 | −9 | A-9 | 3 | 3.5 | 2.96 | 98.7 | Aggregates not present |
| Reference Example 10 | −10 | A-10 | 3 | 3.2 | 2.98 | 99.3 | Aggregates not present |
| Reference Example 11 | −11 | A-11 | 3 | 3.4 | 2.96 | 98.7 | Aggregates not present |
| Reference Example 12 | −12 | A-12 | 3 | 3.3 | 2.97 | 99.0 | Aggregates not present |
| Reference Example 13 | −13 | A-13 | 3 | 3.5 | 2.96 | 98.7 | Aggregates not present |
| Comparative Example 1 | −14 | H-1 | 3 | 18.3 | 2.71 | 90.3 | Aggregates present |
| Comparative Example 2 | −15 | H-2 | 3 | 45.3 | 2.53 | 84.3 | Aggregates present |
| Comparative Example 3 | −16 | H-3 | 3 | 61.8 | 2.32 | 77.3 | Aggregates present |

Reference Examples 15, 18, and 19, Examples 16 and 17, and Comparative Examples 4 to 6

NGR dispersions-2 to 9 were prepared in the same manner as in Reference Example 14, described above, except that combinations shown in Table 7 were adopted.

TABLE 7

Preparation of NGR dispersion

|  | NGR dispersion | Amount (parts) of NGR | Polymeric dispersant Type | Amount* (parts) | Amount (parts) based on 100 parts of NGR | Amount (parts) of water | Total (parts) |
|---|---|---|---|---|---|---|---|
| Reference Example 14 | -1 | 5 | A-1 | 9.92 | 100 | 85.08 | 100 |
| Reference Example 15 | -2 | 5 | A-3 | 9.98 | 100 | 85.02 | 100 |
| Example 16 | -3 | 5 | A-6 | 12.44 | 100 | 82.56 | 100 |
| Example 17 | -4 | 5 | A-8 | 12.20 | 100 | 82.80 | 100 |
| Reference Example 18 | -5 | 5 | A-10 | 9.82 | 100 | 85.18 | 100 |
| Reference Example 19 | -6 | 5 | A-13 | 9.82 | 100 | 85.18 | 100 |
| Comparative Example 4 | -7 | 5 | H-1 | 9.90 | 100 | 85.10 | 100 |
| Comparative Example 5 | -8 | 5 | H-2 | 9.75 | 100 | 85.25 | 100 |
| Comparative Example 6 | -9 | 5 | H-3 | 9.86 | 100 | 85.14 | 100 |

*Amount of liquid containing polymeric dispersant

<Evaluations of NGR Dispersions>

The viscosity at 25° C. was measured for the prepared NGR dispersions using an E-type viscometer. In addition, the median diameter ($D_{50}$ (μm)) of the NGR in each of the NGR dispersions was measured using a dynamic light scattering particle size distribution analyzer. Further, the particle size distribution of the NGR in each of the NGR dispersions was measured using the dynamic light scattering particle size distribution analyzer to check whether or not aggregates were present. Results of the evaluations of the dispersibility of the NGR are shown in Table 8.

TABLE 8

Results of evaluations of dispersibility of NGR

|  | NGR dispersion | Polymeric dispersant | Evaluations of dispersibility | | | |
|---|---|---|---|---|---|---|
|  |  |  | NGR concentration (%) | Viscosity (mPa · s) | Median diameter (μm) | Aggregates |
| Reference Example 14 | -1 | A-1 | 5 | 44.8 | 4.8 | Not present |
| Reference Example 15 | -2 | A-3 | 5 | 46.1 | 4.9 | Not present |
| Example 16 | -3 | A-6 | 5 | 47.6 | 4.7 | Not present |
| Example 17 | -4 | A-8 | 5 | 41.8 | 4.4 | Not present |
| Reference Example 18 | -5 | A-10 | 5 | 40.5 | 4.3 | Not present |
| Reference Example 19 | -6 | A-13 | 5 | 45.7 | 4.6 | Not present |
| Comparative Example 4 | -7 | H-1 | 5 | 87.4 | 10.5 | Present |
| Comparative Example 5 | -8 | H-2 | 5 | 104.6 | 10.9 | Present |
| Comparative Example 6 | -9 | H-3 | 5 | 119.1 | 11.8 | Present |

INDUSTRIAL APPLICABILITY

The carbon material dispersion of the present invention is useful, for example, as a constituent material for aqueous paints, aqueous inks, plastic-shaped products, and the like, which exhibit properties such as high electric conductivity and high thermal conductivity, and is suitable for various applications such as battery materials, trays for electronic parts, covers for IC chips, electromagnetic wave shields, members for automobiles, and parts for robots.

The invention claimed is:

1. An aqueous carbon material dispersion comprising:
   a carbon material;
   water; and
   a polymeric dispersant, wherein the polymeric dispersant is a polymer comprising:
   5 to 40% by mass of a constituent unit (1) from a monomer 1 being a quaternary ammonium salt of at least one basic monomer selected from the group consisting of 2-vinylpyridine, 4-vinylpyridine, and 1-vinylimidazole;
   50 to 80% by mass of a constituent unit (2) from a monomer 2 represented by the following formula (1); and
   0.5 to 40% by mass of a constituent unit (3) from a monomer 3, wherein the monomer 3 is copolymerizable with the monomer 1 and the monomer 2 and is at least one monomer selected from the group consisting of a (meth)acrylic acid-based monomers and a vinyl monomer,
   the polymer having a number average molecular weight in a range from 5,000 to 20,000:

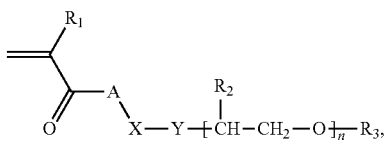

(1)

wherein $R_1$ represents a hydrogen atom or a methyl group, A represents O or NH, X represents an ethylene group or a propylene group, Y represents O, NHCOO, or NHCONH, each of $R_2$ mutually independently represents a hydrogen atom or a methyl group, n represents an average number of repeating units in a range from 20 to 100, and $R_3$ represents a hydrogen atom or a methyl group, a number $n_H$ of repeating units when $R_2$ is a hydrogen atom, is ½ or more of a total number $n_T$ of repeating units in the monomer 2 represented by formula (1).

2. The carbon material dispersion according to claim 1, wherein the carbon material is at least one material selected from the group consisting of carbon black, carbon fibers, carbon nanotubes, graphite, and graphene.

3. The carbon material dispersion according to claim 1, wherein
the monomer 3 comprises α-methylstyrene, and
a content of a constituent unit from the α-methylstyrene in the polymer is in a range from 0.5 to 5% by mass.

4. The carbon material dispersion according to claim 1, wherein
the monomer 3 comprises (meth)acrylic acid, and
a content of a constituent unit from the (meth)acrylic acid in the polymer is in a range from 0.5 to 30% by mass.

5. The carbon material dispersion according to claim 1, wherein
a content of the polymeric dispersant relative to 100 parts by mass of the carbon material is in a range from 10 to 200 parts by mass, and
a content of the carbon material is in a range of 15% by mass or less relative to the carbon material dispersion.

6. The carbon material dispersion according to claim 1, wherein the carbon material dispersion further comprises a water-soluble organic solvent in a range of 20% by mass or less relative to the carbon material dispersion.

7. The carbon material dispersion according to claim 1, wherein the quaternary ammonium salt of the at least one basic monomer is a benzyl chloride salt, naphthylmethyl chloride salt, or anthracenylmethyl chloride salt, of the basic monomer.

* * * * *